Patented June 6, 1950

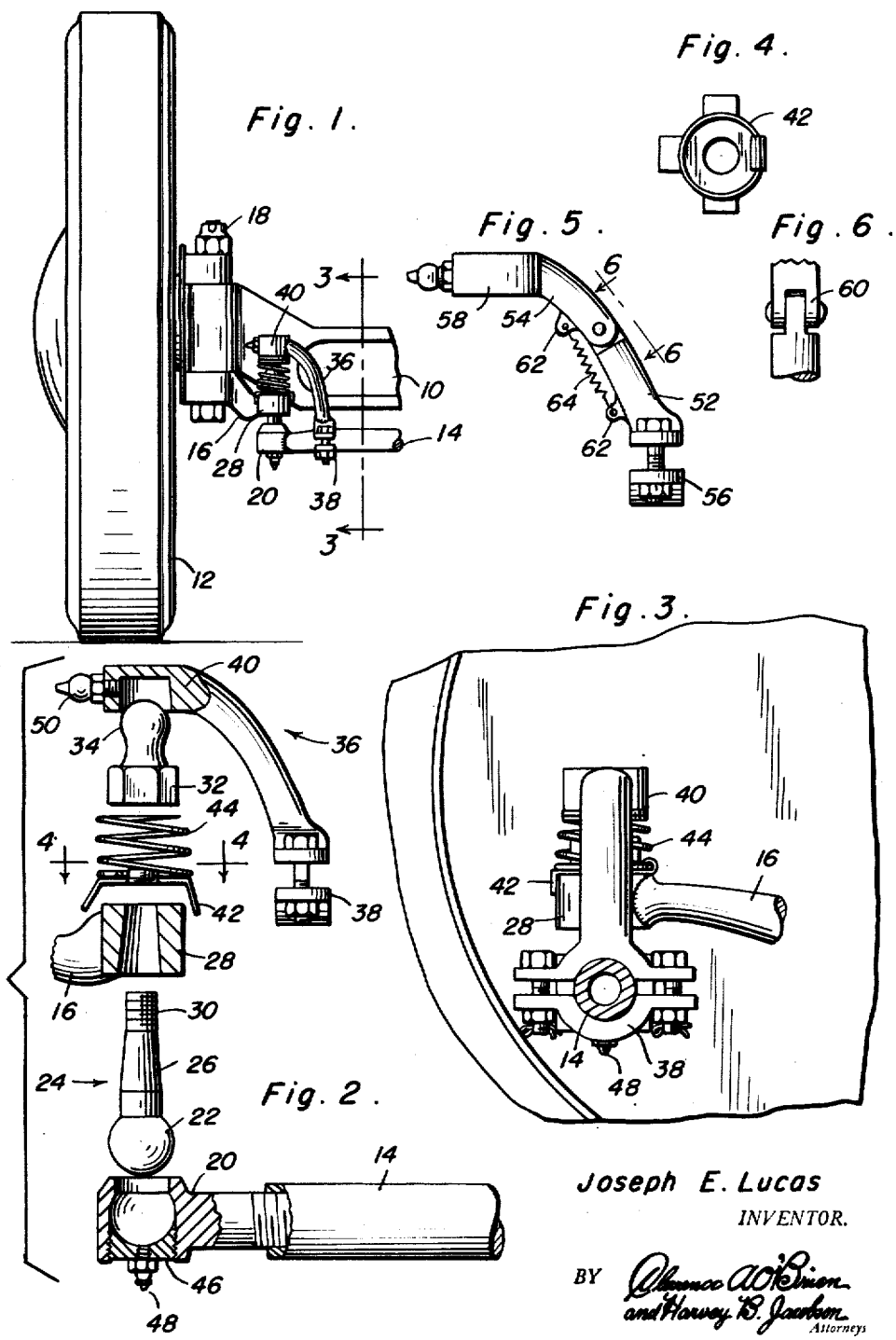

2,510,406

UNITED STATES PATENT OFFICE 2,510,406

MOTOR VEHICLE ANTIWEAR AND ANTIRATTLE JOINT

Joseph E. Lucas, Longview, Tex., assignor of thirteen-twentieths to Richard T. Wells and one-twentieth to John S. T. McDowell, both of Longview, Tex.

Application July 27, 1948, Serial No. 40,806

4 Claims. (Cl. 287—90)

This invention relates generally to universal joints and more particularly to a safety device for incorporation therewith.

A primary object of this invention is to provide means to prevent a ball from becoming loosened from a ball socket in a universal joint, due to wear of the ball and/or socket.

Another object of this invention is to provide means whereby a first member having a ball socket for operatively receiving a ball end on a second member is allowed free universal movement, within limits, while the said first and second members are indirectly biased toward each other.

Another object of this invention, of a specific nature is to provide an arm having one end fixed to said first member and the other end of the arm being indirectly associated with the second member, so that the said other end is biased away from the second member, thus urging the said first member and the said second member together.

Still another object is to provide the above-mentioned arm in two parts pivoted together and having a spring adapted to urge the outer ends of the two parts together.

And a last object to be mentioned specifically is to provide a device of this character which is relatively inexpensive and practicable to manufacture, which is simple and convenient to install and which will not interfere with the normal operation of such jointed mechanisms, and which will give generally efficient and durable service.

With these objects definitely in view, this invention resides in certain novel features of construction, combination and arrangement of elements and portions as will be hereinafter described in detail in this specification, particularly pointed out in the appended claims, and illustrated in the accompanying drawings which form a material part of this application, and in which:

Figure 1 is a fragmentary elevational view of a portion of an automobile with this invention operatively applied thereto;

Figure 2 is an exploded view of the essential portions of the structure in this invention, as illustrated by the same parts as are shown in Figure 1;

Figure 3 is a transverse vertical sectional view, taken substantially upon the line 3—3 in Figure 1;

Figure 4 is a plan view of a lock washer used in this invention;

Figure 5 is a view of a modified form of arm; and

Figure 6 is another view of the joint portion in this modified arm.

Similar characters of reference designate similar or identical elements and portions throughout the specification and throughout the several views in the drawings.

Referring to the drawings in detail, this invention will be observed as being primarily designed for use with structures associated with the steering mechanism of an automotive vehicle. Elements of such an environment will include a transverse frame member 10, a front wheel 12, a tie rod 14 and a steering arm 16. The steering arm will ordinarily have a stub axle associated therewith and will be connected to the transverse member 10 by the king bolt 18.

The tie rod will be hereinafter referred to as a first member 14 and this first member has a ball socket 20 adapted to receive a ball end 22 on a pin, generally indicated by the numeral 24. A shank portion 26 of the pin 24, which portion may comprise a beveled journal, as shown in Figure 2, will be inserted in a socket 28 of corresponding shape on the second member 16, while a threaded end portion 30 of the pin 24 will receive a nut 32, whereby the second member 16 is held onto the pin 24.

The nut 32 has a ball 34 which is associated with a safety arm 36, the one end of which is rigidly secured by a clamp 38 to the first member 14, while the other end of the arm is provided with a socket 40 to receive the ball 34.

A lock washer 42 will seat upon the top of the socket 28 and a helical spring 44 will surround the nut 32 and will be compressed between the upper surface of the lock washer 42 and the lower surface of the socket 40, thus biasing the arm 36 upwardly with respect to the second member 16.

While the exact nature of the socket 20 is immaterial in this application, the drawings represent a preferred form in which a nut member 46 with an arcuate seat therein is screwed into the socket 20 and ordinarily welded in position after insertion.

Grease nipples 48 and 50 may be mounted upon the nut member 46 and the socket 40, respectively.

In the modified form of this invention, illustrated in Figures 5 and 6, the arm is constructed in two parts 52 and 54, pivoted together as indicated at 60. One of these parts 52 is provided with a clamp 56 for securement to the first member 14, when this first member must move in more than one plane relative to the second member, the socket 40 being adapted to rock slightly on the ball 34 when the first member 14 is moved in a second plane. The other part 54 is formed with a socket 58 to receive a ball 34, or the like in order that a very similar arrangement of elements to that already described may be accomplished. However, in this embodiment of the invention, aside from providing for relative movement between the first and second members in more than one plane, there are also provided lugs on each of the members 52 and 54 and a spring 64 is secured under tension between these lugs in such a manner that the parts 52 and 54 are biased so that the free ends thereof will be urged together at all times. This action will be supplementary to the action of the spring 44 in preventing loosening and rattling of the parts during use of the invention.

The operation of this invention will be clearly understood from a consideration of the foregoing description of the mechanical details thereof, taken in connection with the above recitation of objects and the drawings. It will be clear that all of the objects can be attained by either form of this invention illustrated in the drawings and described above, and further description would appear unnecessary.

Obviously many minor variations may be made in the exact construction and proportionment of the various elements of this invention all without departure from the spirit thereof, and the scope of this invention should be determined only as limited by a proper interpretation of the terms used in the subjoined claims.

Having described the invention, what is claimed as new is:

1. In a joint for steering arms, drag links and the like, a pivot pin with a ball end and shank portion, a first member having a ball socket operatively receiving said ball end, a second member having a socket operatively receiving said shank portion, a nut on the end of said shank remote from said ball and retaining said shank portion in said second member, an auxiliary safety arm having one end secured to said first member and the other end pivotally connected on said nut, whereby the first and second members are positively prevented from becoming disconnected.

2. In a joint for steering arms, drag links and the like, a pivot pin with a ball end and shank portion, a first member having a ball socket operatively receiving said ball end, a second member having a socket operatively receiving said shank portion, a nut on the end of said shank remote from said ball and retaining said shank portion in said second member, an auxiliary safety arm having one end secured to said first member and the other end pivotally connected on said nut, said nut having a ball and said other end of the arm having a socket to receive the ball on the nut, said arm being itself rigid, whereby the first and second members are positively prevented from becoming disconnected.

3. A joint according to claim 1 and wherein said arm is comprised of two parts having a knee joint, a spring connected under tension to the parts and across the knee joint to aid in retaining the ball and ball end in said sockets and to minimize rattling of the parts during use.

4. A joint according to claim 1 and wherein said arm is jointed to allow relative motion of the first and second members in more than one plane.

JOSEPH E. LUCAS.

REFERENCES CITED

The following references are of record in the file of this patent:

UNITED STATES PATENTS

| Number | Name | Date |
| --- | --- | --- |
| 1,150,125 | King | Aug. 17, 1915 |
| 2,208,325 | Krutsch | July 16, 1940 |